US012600886B2

(12) United States Patent
Song et al.

(10) Patent No.: US 12,600,886 B2
(45) Date of Patent: Apr. 14, 2026

(54) RESINS FOR ADHESIVE BONDING OF FABRICS

(71) Applicant: Toyota Motor Engineering & Manufacturing North America, Inc., Plano, TX (US)

(72) Inventors: Yuyang Song, Ann Arbor, MI (US); Masato Tanaka, Ann Arbor, MI (US); Liang Yue, Atlanta, GA (US); Hang Qi, Marietta, GA (US)

(73) Assignees: Toyota Motor Engineering & Manufacturing North America, Inc., Plano, TX (US); Toyota Jidosha Kabushiki Kaisha, Toyota (JP); Georgia Tech Research Corporation, Atlanta, GA (US)

( * ) Notice: Subject to any disclaimer, the term of this patent is extended or adjusted under 35 U.S.C. 154(b) by 729 days.

(21) Appl. No.: 17/951,312

(22) Filed: Sep. 23, 2022

(65) Prior Publication Data

US 2024/0101875 A1    Mar. 28, 2024

(51) Int. Cl.
| | |
|---|---|
| *C09J 133/08* | (2006.01) |
| *C09J 7/10* | (2018.01) |
| *C09J 11/04* | (2006.01) |
| *C09J 11/06* | (2006.01) |

(52) U.S. Cl.
CPC .............. *C09J 133/08* (2013.01); *C09J 7/10* (2018.01); *C09J 11/04* (2013.01); *C09J 11/06* (2013.01); *C09J 2203/358* (2020.08); *C09J 2301/408* (2020.08); *C09J 2400/263* (2013.01)

(58) Field of Classification Search
CPC ...................................... C09J 133/08
See application file for complete search history.

(56) References Cited

U.S. PATENT DOCUMENTS

| | | | |
|---|---|---|---|
| 9,284,461 B2 | 3/2016 | Nakamura et al. | |
| 2014/0308457 A1* | 10/2014 | Kim ........................... | C09J 7/10 427/517 |
| 2022/0040914 A1* | 2/2022 | Deore ................... | C08F 220/22 |

FOREIGN PATENT DOCUMENTS

JP        S62279691 A  * 12/1987

OTHER PUBLICATIONS

Machine translation of JPS62279691A. (Year: 1987).*
Rashid et al., "Vat photopolymerization of polymers and polymer composites: Processes and applications," Additive Manufacturing, vol. 47, Nov. 2021, pp. 1-35.
Sanatagar et al., "Investigation of the adhesion properties of direct 3D printing of polymers and nanocomposites on textiles: Effect of FDM printing process parameters," Applied Surface Science, vol. 403, Jan. 17, 2017, pp. 551-563.
Chen et al., "Fabrication of tough epoxy with shape memory effects by UV-assisted direct-ink write printing," Soft Matter, 14, 2018, pp. 1879-1886.
Qi et al., "3D Printing of Highly Stretchable, Shape-Memory, and Self-Healing Elastomer toward Novel 4D Printing," ACS Appl. Mater. Interfaces, Feb. 5, 2018, vol. 10, pp. 7381-7388.
Lin et al., "Mechanical properties, accuracy, and cytotoxicity of UV-polymerized 3D printing resins composed of BisEMA, UDMA, and TEGDMA," The Journal of Prosthetic Dentistry, vol. 123, issue 2, 2020, pp. 1-6.
Pei et al., "Direct 3D Printing of Polymers onto Textiles: Experimental Studies and Applications," Rapid Prototyping Journal, vol. 21, No. 5, 2015, pp. 556-571.
Roach et al., "4D Printing Based on Multi-Material Design," Manufacturing in the Era of 4th Industrial Revolution, Mar. 2021, pp. 163-194.
Montgomery et al., "Recent Advances in Additive Manufacturing of Active Mechanical Metamaterials," Current Opinion in solid State and Materials Science, vol. 24, issue 5, Oct. 2020, pp. 1-45.

* cited by examiner

*Primary Examiner* — Wenwen Cai
(74) *Attorney, Agent, or Firm* — Christopher G. Darrow; Darrow Mustafa PC

(57)        ABSTRACT

A resin for adhesive bonding to fabrics includes between about 80 wt. % and about 90 wt. % of a monomer, between about 10 wt. % and about 20 wt. % of a cross-linking agent with two or more acrylic acid groups separated by a flexible linker, between about 0.5 wt. % and about 1.5 wt. % of a photoinitiator, and between about 10 wt. % and about 15 wt. % of a thickening agent. The monomer has a melting point less than 25° C. and the flexible linker has subunits such as methylene glycol, ethylene glycol, propylene glycol, butylene glycol, and combinations thereof. Also, the resin forms a bond with polyurethane coated nylon fabric and the bond exhibits an adhesion strength greater than a tensile strength of the polyurethane coated nylon fabric.

18 Claims, 3 Drawing Sheets

RESINS FOR ADHESIVE BONDING OF FABRICS

TECHNICAL FIELD

The present disclosure generally relates to resins, and particularly to resins for adhesive bonding to fabrics.

BACKGROUND

Digital ink writing three dimensional (DIW 3D) printing is an extrusion-based additive manufacturing technique in which a liquid-phase resin is extruded or pushed through and from a nozzle to form a layer, which is subsequently cured, on a build platform. In addition, subsequent layers are extruded onto prior cured layers such that a 3D printed structure is formed "layer-by-layer" from The present disclosure addresses issues with DIW 3D printing resins, and other issues related to DIW 3D printing.

SUMMARY

In one form of the present disclosure, a resin includes a monomer with a melting point less than 25° C., a cross-linking agent that has two or more acrylic acid groups separated by a flexible linker, a photoinitiator, and a thickening agent. The monomer is acrylic acid and/or a functionalized acrylic acid and the flexible linker includes subunits such as methylene glycol, ethylene glycol, propylene glycol, butylene glycol, and combinations thereof.

In another form of the present disclosure, a resin for adhesive bonding to fabrics includes between about 80 wt. % and about 90 wt. % of a monomer, between about 10 wt. % and about 20 wt. % of a cross-linking agent with two or more acrylic acid groups separated by a flexible linker, between about 0.5 wt. % and about 1.5 wt. % of a photoinitiator, and between about 10 wt. % and about 15 wt. % of a thickening agent. The monomer has a melting point less than 25° C. and the flexible linker has subunits such as methylene glycol, ethylene glycol, propylene glycol, butylene glycol, and combinations thereof.

In still another form of the present disclosure, a resin for adhesive bonding to fabrics includes between about 80 wt. % and about 90 wt. % of a monomer such as acrylic acid and/or a functionalized acrylic acid, the melting point of the monomer being less than 25° C., and between about 10 wt. % and 20 wt. % of a cross-linking agent that includes polyethylene glycol diacrylate with a molecular weight between 500-1000 g/mol. The resin also includes between about 0.5 wt. % and about 1.5 wt. % of a photoinitiator, and between about 10 wt. % and about 15 wt. % of a thickening agent such as silica, fumed silica, organoclay, bentonite, cellulose, guar gum, xanthan gum, polysaccharides, and combinations thereof.

These and other features of the composite salt mixture and its preparation will become apparent from the following detailed description when read in conjunction with the figures and examples, which are exemplary, not limiting.

BRIEF DESCRIPTION OF THE DRAWINGS

The present teachings will become more fully understood from the detailed description and the accompanying drawings, wherein.

It should be noted that the figures set forth herein are intended to exemplify the general characteristics of the composite salt mixtures and electrolytes of the present technology, for the purpose of the description of certain aspects. The figures may not precisely reflect the characteristics of any given aspect and are not necessarily intended to define or limit specific forms or variations within the scope of this technology.

DETAILED DESCRIPTION

The present disclosure provides resins that exhibit or have enhanced adhesion to fabrics. For example, in some variations the resins, after being manually applied or DIW 3D printed onto a fabric, exhibit an adhesive strength greater than the strength of the fabric. Accordingly, in some variations the resins provide for DIW 3D printing of a structure onto a fabric and the structure has an adhesive strength with the fabric that is greater than the strength of the fabric itself. In addition, the resins provide bonding of a fabric to itself and/or bonding of two or more fabric components together with an adhesion strength of the bond being greater than the strength of the fabric(s).

Figures 1, 2:
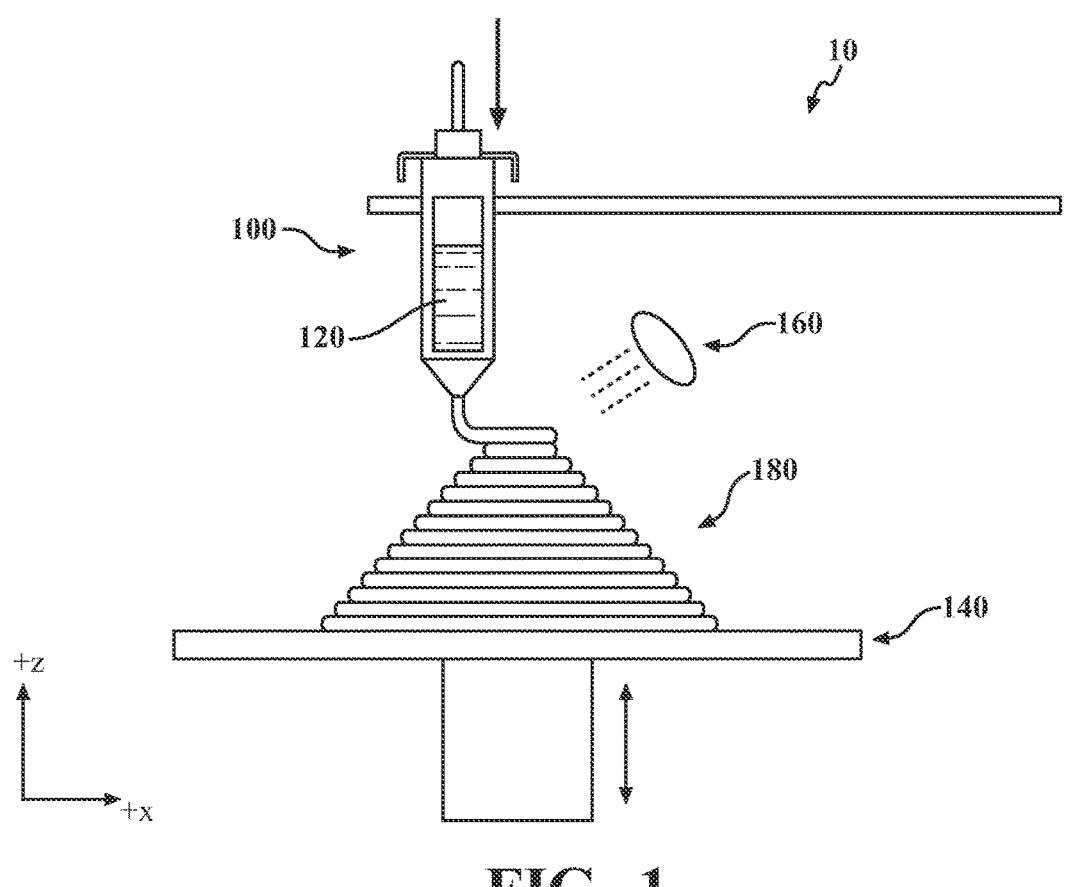
FIG. 1 illustrates a DIW 3D printer.
FIG. 2 illustrates components of a resin according to the teachings of the present disclosure.

Referring to FIG. 1, a DIW 3D printer 10 building a 3D structure is shown. The DIW 3D printer 10 includes an ink (resin) dispenser 100 containing a resin 120 according to the teachings of the present disclosure, and a build platform 140. In some variations, the DIW 3D printer 10 includes a light source 160, e.g., an ultraviolet (UV) light source 160, to assist curing of the resin 120 after being dispensed from the ink dispenser 100. The ink dispenser 100 is configured to move in the +/−x direction, the +/−y direction, and/or the +/−z direction shown in the figure. In addition, the build platform 140 can be configured to move in the +/−z direction.

In operation, the ink dispenser 100 dispenses a layer 180 of the resin 120 onto the build platform 140, the build platform then moves in the −z direction shown in the figure by a registered/predefined amount, and the ink dispenser 100 dispenses another layer 180 of the resin 120 such that a structure is formed layer-by-layer. In some variations, each layer 180 of the resin is at least partially cured before a subsequent layer 180 is disposed on the previously applied layer 180. For example, in at least one variation the UV light source 160 irradiates each layer 180 of the resin 120 with UV light prior to a subsequent layer 180 of the resin being dispensed thereon.

It should be understood that 3D printing allows for the fabrication of components and structures with geometric and material complexities beyond what is physically and/or economically possible with traditional manufacturing techniques such as casting, machining, cold working, hot working, among others. And new 3D printing capabilities have demonstrated use in functional applications or structures such as deployable structures, soft robotics, flexible electrical components, and biomimetic designs. However, many functional applications such as nature-like structures, airless tires, multi-stable absorbers, and 4D printing require the use of materials with vastly different properties. That is, such structures have or require different portions with very different mechanical and/or physical properties. In addition, some structures have or require bonding of fabrics, e.g., bonding of a first portion of a fabric component to a second portion of the same fabric component and/or bonding of a first fabric component to a second fabric component.

Referring to FIG. 2, the resin 120 can include a monomer 122 such as acrylic acid and/or a functionalized acrylic acid (not shown), and a cross-linking agent 124. The monomer has a melting temperature less than 25° C., and in some variations, the cross-linking agent has a molecular weight between about 500 g/mol and about 1000 g/mol, e.g., 700 g/mol. In at least one variation, the cross-linking agent includes two or more acrylic acid groups 125 separated by a flexible linker 126. And in some variations, the flexible linker 126 includes one or more subunits 127. Non-limiting examples of the one or more subunits include methylene glycol, ethylene glycol, propylene glycol, butylene glycol, and combinations thereof, among others.

In some variations, the resin 120 includes a photoinitiator and/or a thickening agent. Non-limiting examples of the photoinitiator include 2,2-Dimethoxy-1,2-diphenylethan-1-one, 2-Hydroxy-2-methyl-1-phenylpropanone, 1-Hydroxy-cyclohexylphenylketone, benzophenone, isopropyl thioxanthone, 2-ethylhexyl-(4-N,N-dimethyl amino)benzoate, ethyl-4-(dimethylamino)benzoate, among others. Non-limiting examples of the thickening agent include silica, fumed silica, organoclay, bentonite, cellulose, guar gum, xanthan gum, polysaccharides, and combinations thereof, among others.

In some variations, the resin 120 includes between about 50 wt. % and 99.7 wt. % of the monomer, for example between about 80 wt. % and about 90 wt. % of the monomer. And in at least one variation, the resin 120 includes between about 82.5 wt. % and 87.5 wt. % of the monomer.

In some variations, the resin 120 includes between about 0.01 wt. % and 25 wt. % of the cross-linking agent, for example between about 10 wt. % and about 20 wt. % of the cross-linking agent. And in at least one variation, the resin 120 includes between about 12.5 wt. % and 17.5 wt. % of the cross-linking agent.

In variations where the resin 120 includes the photoinitiator, the resin 120 includes between about 0.01 wt. % and about 2 wt. % of the photoinitiator, e.g., between about 0.5 wt. % and about 1.5 wt. % of the photoinitiator. And in at least one variation, the resin 120 includes between about 0.75 wt. % and 1.25 wt. % of the photoinitiator.

In variations where the resin 120 includes the thickening agent, the resin 120 includes between about 0.01 wt. % and about 25 wt. % of the thickening agent, e.g., between about 10 wt. % and about 15 wt. % of the thickening agent. And in at least one variation, the resin 120 includes between about 11 wt. % and about 13 wt. % of the thickening agent.

In variations where the resin 120 includes the photoinitiator and the thickening agent, the resin can include between about 50 wt. % and about 99.7 wt. % of the monomer, between about 0.01 wt. % and about 25 wt. % of the cross-linking agent, between about 0.01 wt. % and about 2 wt. % of the photoinitiator, and between about 0.01 wt. % and about 25 wt. % of the thickening agent. In at least one variation, the resin 120 includes between about 80 wt. % and about 90 wt. % of the monomer, between about 10 wt. % and about 20 wt. % of the cross-linking agent, between about 0.5 wt. % and about 1.5 wt. % of the photoinitiator, and between about 10 wt. % and about 15 wt. % of the thickening agent. And in some variations, the resin 120 includes between about 82.5 wt. % and about 87.5 wt. % of the monomer, between about 12.5 wt. % and about 17.5 wt. % of the cross-linking agent, between about 0.75 wt. % and about 1.25 wt. % of the photoinitiator, and between about 11 wt. % and about 13 wt. % of the thickening agent. And while in at least one variation the resin 120 can include other components, in some variations the resin 120 does not include other components except for impurities known by those skilled in the art to be present in such resins.

Figure 3A:
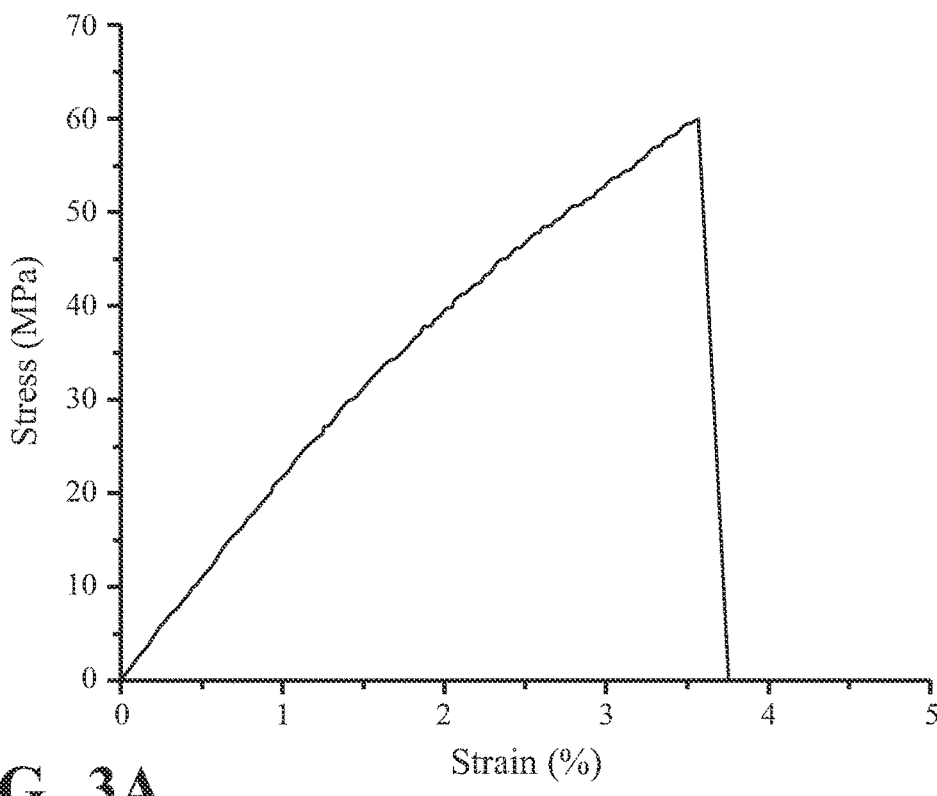
FIG. 3A is a plot of stress versus strain for a tensile sample manufactured with a DIW 3D printer using a resin according to the teachings of the present disclosure.

Regarding mechanical properties of the resin 120, FIG. 3A shows a plot of stress versus strain for tensile testing of the resin 120. The resin 120 had a chemical composition of 85 wt. % of the monomer, 15 wt. % of the cross-linking agent, 1 wt. % of the photoinitiator, and 12 wt. % of the thickening agent. Also, the monomer was acrylic acid, the cross-linking agent was polyethylene glycol diacrylate 700, the photoinitiator was photoinitiator 819 (phenylbis(2,4,6-trimethylbenzoyl)phosphine oxide). Accordingly, in some variations the resins according to the teachings of the present disclosure have a tensile strength greater than about 40 megapascals (MPa) and a strain to failure greater than about 2 percent (%). For example, in some variations the resins have a tensile strength between about 40 MPa and 80 MPa, and a strain to failure between about 2% and about 6%. In at least one variation, the resins have a tensile strength between about 50 MPa and 70 MPa, and a strain to failure between about 2.5% and 4.5%. And in some variations, the resins have a tensile strength between about 55 MPa and 65 MPa, and a strain to failure between about 3.0% and 4.5%. Also, in at least one variation, the resins have a Young's modulus greater than about 1.5 gigapascals (GPa). For example, in some variations the resins have a Young's modulus greater than about 1.5 GPa and less than about 3.0 GPa. In at least one variation, the resins have a Young's modulus between about 1.75 GPa and 2.5 GPa. And in some variations, the resins have a Young's modulus between about 1.8 GPa and 2.2 GPa. It should be understood that the above disclosed values for tensile strength, strain to failure, and Young's modulus are for the resins at room temperature (e.g., 27° C.).

Figure 3B:
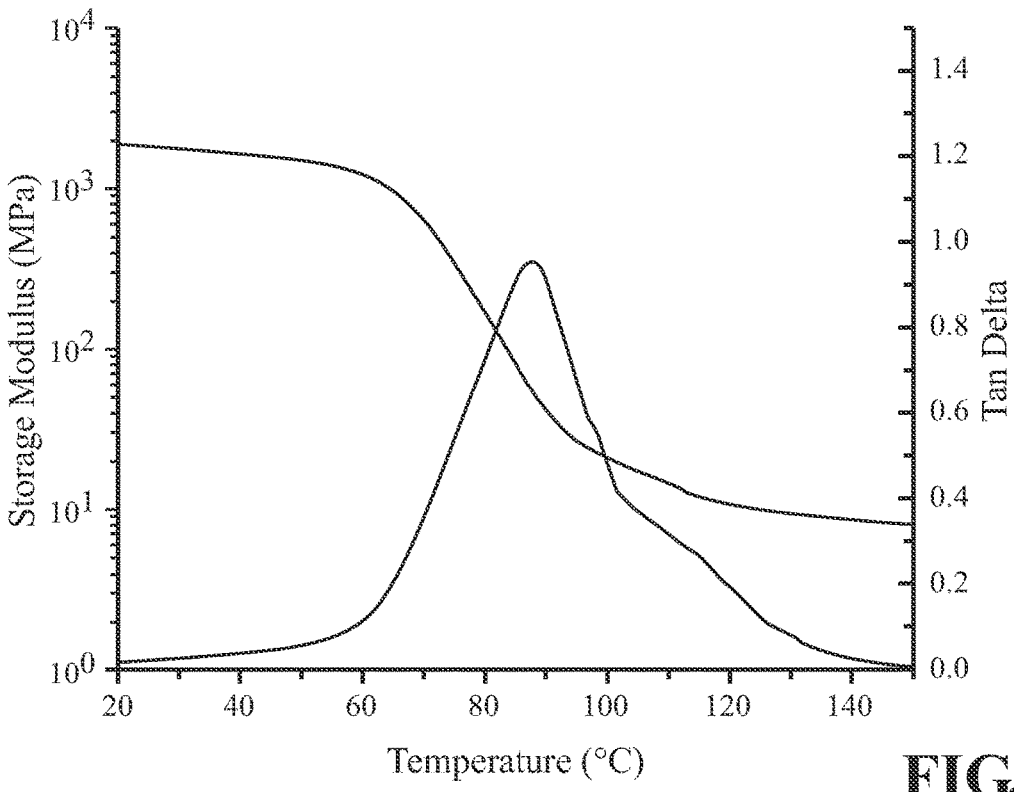
FIG. 3B is a plot of storage modulus and Tan delta as a function of temperature for a resin according to the teachings of the present disclosure.

Regarding the thermomechanical properties of the resin 120, FIG. 3B shows a plot of storage modulus and Tan delta as a function of temperature of the resin 120. The resin 120 had a chemical composition of 85 wt. % of the monomer, 15 wt. % of the cross-linking agent, 1 wt. % of the photoinitiator, and 12 wt. % of the thickening agent. Also, the monomer was acrylic acid, the cross-linking agent was polyethylene glycol diacrylate 700, the photoinitiator was photoinitiator 819 (phenylbis(2,4,6-trimethylbenzoyl)phosphine oxide). Accordingly, in some variations the resins have a storage modulus greater than about 500 MPa at temperatures greater than a glass transition temperature (T g) of the resins 120 and less than about 100 MPa at temperatures less than the glass transition temperature of the resins. For example, in some variations the resins have a glass transition temperature between about 80° C. and 100° C., a storage modulus between about 100 MPa and about 4,000 MPa at temperatures less than 80° C., and a storage modulus between about 40 MPa and about 2 MPa at temperatures greater than 100° C. In at least one variation, the resins have a glass transition temperature between about 85° C. and 95° C., a storage modulus between about 100 MPa and about 300 MPa at temperatures less than 30° C., and a storage modulus between about 1 MPa and about 3 MPa at temperatures greater than 105° C. And in some variations, the resins have a glass transition temperature between about 85° C. and 92° C., a storage modulus between about 150 MPa and about 250 MPa at temperatures less than 30° C., and a storage modulus between about 7 MPa and about 20 MPa at temperatures greater than 120° C.

In an effort to better describe the resins according to the present disclosure, their properties, and their capabilities, and yet not to limit the scope of the present disclosure in any manner, one example composition of the resin 120 and corresponding properties are discussed below.

Figures 4, 5:
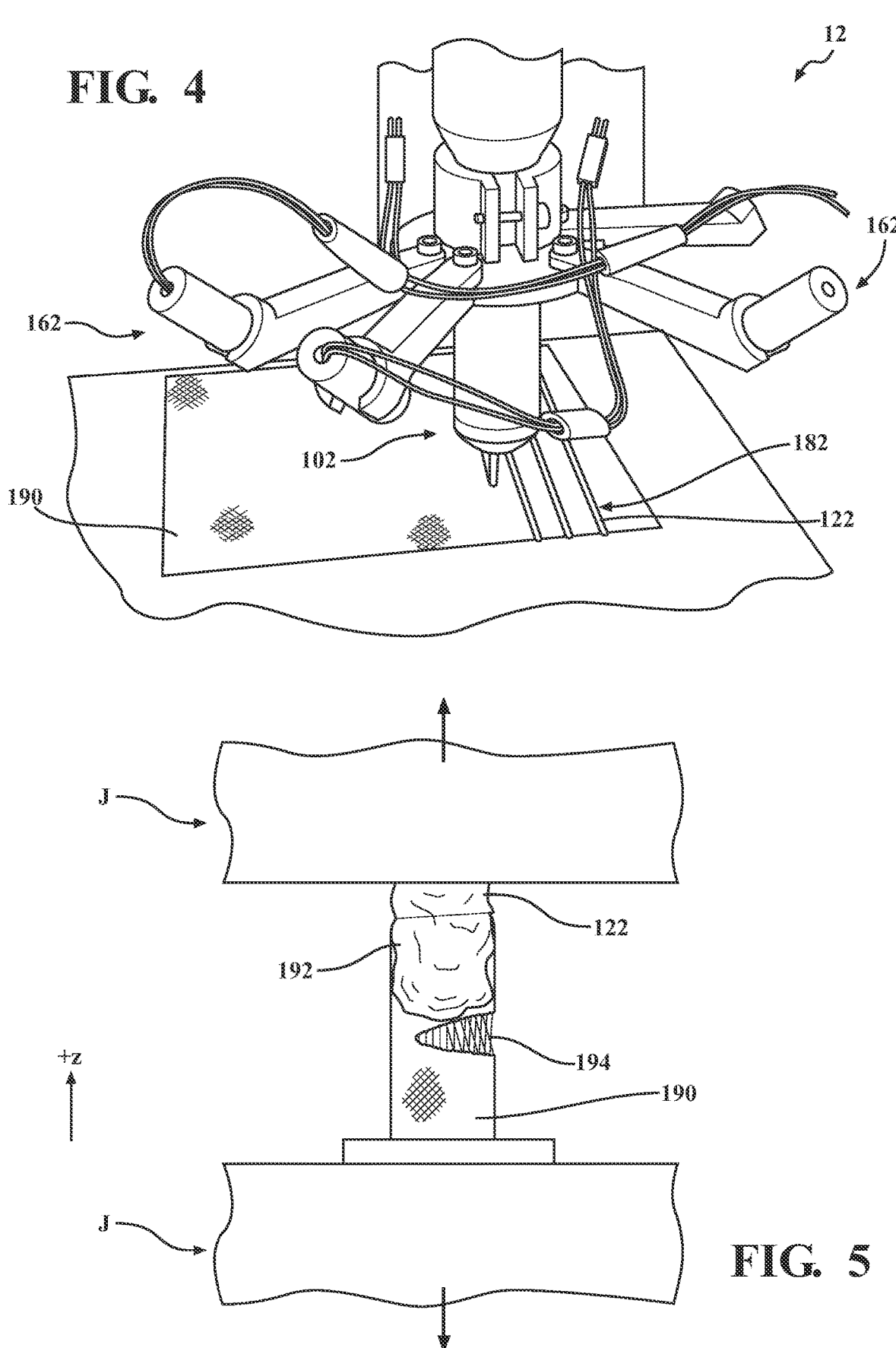
FIG. 4 illustrates another DIW 3D printer printing a plurality of resin beads onto a fabric according to the teachings of the present disclosure.
FIG. 5 illustrates a sample of a resin according to the teachings of the present disclosure DIW 3D printed onto a fabric to form a tensile sample and the tensile sample subjected to tensile strain.

Referring to FIG. 4, a DIW 3D printer 12 configured to apply the resin 120 to a fabric 190 is shown. DIW 3D printer 12 includes an ink dispenser 102 containing the resin 120, a build platform or table 142, and at least one UV light source 162. The ink dispenser 102 is configured to move in the +/−x direction, the +/−y direction, and/or the +/−z direction shown in the figure.

The fabric 190 illustrated in FIG. 4 is polyurethane coated nylon fabric and the resin 120 has a chemical composition of 85 wt. % of the monomer, 15 wt. % of the cross-linking agent, 1 wt. % of the photoinitiator, and 12 wt. % of the thickening agent. Also, the monomer was acrylic acid, the cross-linking agent was polyethylene glycol diacrylate 700, and the photoinitiator was photoinitiator 819 (phenylbis(2, 4,6-trimethylbenzoyl)phosphine oxide).

The DIW 3D printer 12 dispensed a plurality of beads 182 of the resin 120 onto the fabric 190 along predefined paths. The resin 120 was at least partially cured via UV light from the at least one UV light source 162 to form beads 182 of cured resin 120c. Accordingly, the beads of resin 120 were applied as an adhesive on the fabric 190.

It should be understood that in some variations a pre-defined amount of time is allowed to expire before the bead 182 of the resin 120 is exposed to the UV light from the at least one UV light source 162. For example, it may be desirable for the resin 120, before curing, to penetrate within pores and crevices within the fabric 190 in order to enhance adhesion between the cured resin 120c and the fabric 190.

Referring now to FIG. 5, the DIW 3D printer 12 manu-factured a sample 20 for tensile testing by dispensing the resin 120 onto an end 192 of a piece of the fabric 190 such that the resin 120 overlapped onto and extended beyond the end 192. In addition, and after the resin 120 was cured to form cured resin 120c, opposite ends of the sample 20 were clamped between jaws J of a tensile testing machine and the sample 20 was subjected to uniaxial strain in the z-direction until failure occurred. And as observed from FIG. 5, the sample 20 failed at a location within the fabric 190 at location 194, not at the bond between the fabric 190 and the cured resin 120c or within the cured resin 120c extending beyond (+z direction) the end 192 of the fabric 190. Accord-ingly, the cured resin 120c exhibited an adhesion strength greater than a tensile strength of the polyurethane coated nylon fabric 190.

As reported in the reference titled "DEVELOPMENT OF SPECIALTY COATED FABRICS FOR CANOPY OF INFLATABLE MILITARY TENT (IMT) FOR FOREST AREA" by Das et al., International Journal of Research— GRANTHAALAYAH, 9(2), 81-92, polyurethane coated nylon fabrics can exhibit bursting strengths between about 60 Kgf/cm² (5.9 MPa) to about 75 Kgf/cm² (7.4 MPa). Accordingly, and assuming the fabric 190 had a bursting strength equal to about 75 Kgf/cm², the cured resin 120c formed a bond with the polyurethane coated nylon fabric with an adhesion strength greater than 7.4 MPa. In addition, the cured resin 120c extending beyond the end 192 had a tensile strength greater than 7.4 MPa.

In some variations, resins according to the teachings of the present disclosure have an adhesion strength greater than about 10 MPa, for example, greater than about 15 MPa. And in at least one variation, resins according to the teachings of the present disclosure have an adhesion strength greater than about 20 MPa, for example, greater than about 30 MPa, or greater than about 50 MPa. In some variations, resins according to the teachings of the present disclosure have an adhesion strength between about 5 MPa and about 50 MPa, for example, between about 10 MPa and about 40 MPa. In at least one variation, resins according to the teachings of the present disclosure have an adhesion strength between about 10 MPa and about 30 MPa, for example, between about 10 MPa and about 20 MPa. And in at least one variation, resins according to the teachings of the present disclosure have an adhesion strength between about 10 MPa and about 50 MPa, for example, between about 20 MPa and about 50 MPa, between about 30 MPa and about 50 MPa, or between about 40 MPa and about 50 MPa.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclo-sure of all ranges and subdivided ranges within the entire range.

The headings (such as "Background" and "Summary") and sub-headings used herein are intended only for general organization of topics within the present disclosure and are not intended to limit the disclosure of the technology or any aspect thereof. The recitation of multiple forms or variations having stated features is not intended to exclude other forms or variations having additional features, or other forms or variations incorporating different combinations of the stated features.

As used herein the terms "about" and "generally" when related to numerical values herein refer to known commer-cial and/or experimental measurement variations or toler-ances for the referenced quantity. In some variations, such known commercial and/or experimental measurement toler-ances are +/−10% of the measured value, while in other variations such known commercial and/or experimental measurement tolerances are +/−5% of the measured value, while in still other variations such known commercial and/or experimental measurement tolerances are +/−2.5% of the measured value. And in at least one variation, such known commercial and/or experimental measurement tolerances are +/−1% of the measured value.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that a form or variation can or may comprise certain elements or features does not exclude other forms or variations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with a form or variation is included in at least one form or variation. The appearances of the phrase "in one variation" or "in one form" (or variations thereof) are not necessarily referring to the same form or variation. It should be also understood that the various method steps discussed herein do not have to be carried out in the same order as depicted, and not each method step is required in each form or variation.

The foregoing description of the forms or variations has been provided for purposes of illustration and description. It is not intended to be exhaustive or to limit the disclosure. Individual elements or features of a particular form or variation are generally not limited to that particular form or variation, but, where applicable, are interchangeable and can be used in a selected form or variation, even if not specifically shown or described. The same may also be varied in many ways. Such variations should not be regarded as a departure from the disclosure, and all such modifications are intended to be included within the scope of the disclosure.

While particular forms or variations have been described, alternatives, modifications, variations, improvements, and substantial equivalents that are or may be presently unforeseen may arise to applicants or others skilled in the art. Accordingly, the appended claims as filed and as they may be amended, are intended to embrace all such alternatives, modifications variations, improvements, and substantial equivalents.

What is claimed is:

1. A resin comprising:
between about 80 wt. % and about 90 wt. % of acrylic acid;
between about 10 wt. % and about 20 wt. % of polyethylene glycol diacrylate;
between about 0.5 wt. % and about 1.5 wt. % of a photoinitiator; and
between about 10 wt. % and about 15 wt. % of fumed silica.

2. The resin according to claim 1, wherein the polyethylene glycol diacrylate has a molecular weight between about 500 g/mol and 1000 g/mol.

3. The resin according to claim 1, wherein when the resin is bonded to a polyurethane coated nylon fabric, and cured, the cured resin has an adhesion strength greater than a tensile strength of the polyurethane coated nylon fabric.

4. The resin according to claim 3, wherein the polyethylene glycol diacrylate is polyethylene glycol diacrylate 700.

5. The resin according to claim 1, wherein a direct ink writing layer of the resin, when cured, has a tensile strength between about 40 MPA and about 80 MPa, and a strain to failure between about 2% and about 6%.

6. The resin according to claim 5, wherein the tensile strength is between about 50 MPA and about 70 MPa, and the strain to failure is between about 2.5% and about 4.5%.

7. The resin according to claim 6, wherein tensile strength is between about 55 MPA and about 65 MPa, and the strain to failure is between about 3.0% and about 4.5%.

8. The resin according to claim 1 comprising
between about 82.5 wt. % and about 87.5 wt. % of the acrylic acid;
between about 12.5 wt. % and about 17.5 wt. % of the polyethylene glycol diacrylate;
between about 0.75 wt. % and about 1.25 wt. % of the photoinitiator; and
between about 11 wt. % and about 13 wt. % of the fumed silica.

9. The resin according to claim 1, wherein the resin is an ink configured for direct ink writing.

10. The resin according to claim 1, wherein a direct ink writing layer of the resin, when cured, has a Young's modulus greater than about 1.5 GPa at 27° C.

11. The resin according to claim 10, wherein the Young's modulus is greater than about 1.5 GPa and less than about 3.0 GPa at 27° C.

12. A resin for adhesive bonding to fabrics, the resin having a composition comprising:
between about 82.5 wt. % and about 87.5 wt. % of acrylic acid;
between about 12.5 wt. % and 17.5 wt. % of polyethylene glycol diacrylate 700;
between about 0.75 wt. % and about 1.25 wt. % of a photoinitiator; and
between about 11 wt. % and about 13 wt. % of fumed silica.

13. The resin according to claim 12, wherein when the resin is bonded to polyurethane coated nylon fabric, and cured, the cured resin has an adhesion strength greater than a tensile strength of the polyurethane coated nylon fabric.

14. The resin according to claim 12, wherein a direct ink writing layer of the resin, when cured, has a tensile strength between about 40 MPA and about 80 MPa, and a strain to failure between about 2% and about 6%.

15. The resin according to claim 14, wherein the tensile strength is between about 50 MPA and about 70 MPa, and the strain to failure is between about 2.5% and about 4.5%.

16. The resin according to claim 15, wherein the tensile strength is between about 55 MPA and about 65 MPa, and the strain to failure is between about 3.0% and about 4.5%.

17. The resin according to claim 16, wherein the resin, when cured, has a Young's modulus greater than about 1.5 GPa at 27° C.

18. The resin according to claim 17, wherein the Young's modulus is greater than about 1.5 GPa and less than about 3.0 GPa at 27° C.

* * * * *